US008694059B2

(12) United States Patent
Momma

(10) Patent No.: US 8,694,059 B2
(45) Date of Patent: Apr. 8, 2014

(54) MOBILE COMMUNICATION DEVICE AND ECHO CANCELLATION METHOD

(75) Inventor: Masaki Momma, Yokohama (JP)

(73) Assignee: Kyocera Corporation, Kyoto (JP)

( * ) Notice: Subject to any disclaimer, the term of this patent is extended or adjusted under 35 U.S.C. 154(b) by 41 days.

(21) Appl. No.: 13/455,380

(22) Filed: Apr. 25, 2012

(65) Prior Publication Data

US 2012/0276961 A1 Nov. 1, 2012

(30) Foreign Application Priority Data

Apr. 26, 2011 (JP) ................................ 2011-098656

(51) Int. Cl.
*H04B 1/38* (2006.01)

(52) U.S. Cl.
USPC ..................... 455/570; 455/569.1; 455/575.1; 455/575.8; 455/90.1; 379/406.06

(58) Field of Classification Search
USPC ............... 455/570, 569.1, 575.1, 575.8, 90.1; 379/406.06
See application file for complete search history.

(56) References Cited

U.S. PATENT DOCUMENTS

2010/0128868 A1* 5/2010 Suppappola ............. 379/406.06

FOREIGN PATENT DOCUMENTS

JP 2008182296 A 8/2008

* cited by examiner

*Primary Examiner* — Sanh Phu
(74) *Attorney, Agent, or Firm* — Lowe Hautman & Ham, LLP

(57) ABSTRACT

According to an aspect, a mobile communication device includes a housing, a speaker, a microphone, a detecting unit, and a processing unit. The speaker is provided in the housing, and outputs an incoming voice according to an incoming voice signal. The microphone is provided in the housing. The microphone receives an outgoing voice and outputs an outgoing voice signal in response to reception of the outgoing voice. The detecting unit detects vibration of the housing and outputs a housing-vibration signal indicating the vibration of the housing. The processing unit performs echo cancellation to the outgoing voice signal based on the incoming voice signal and the housing-vibration signal.

9 Claims, 11 Drawing Sheets

MOBILE COMMUNICATION DEVICE AND ECHO CANCELLATION METHOD

CROSS-REFERENCE TO RELATED APPLICATIONS

This application claims priority from Japanese Application No. 2011-098656, filed on Apr. 26, 2011, the content of which is incorporated by reference herein in its entirety.

BACKGROUND

1. Technical Field

The present disclosure relates to a mobile communication device with a voice call function and an echo cancellation method.

2. Description of the Related Art

In mobile communication devices such as a mobile phone and personal handyphone system (PHS), echo may occur when an incoming voice travels to be superimposed on an outgoing voice. As a technology for preventing such echo, Japanese Patent Application Laid-open No. 2008-182296 describes a mobile terminal device that includes a speaker and a microphone and also includes a sound insulator for insulating between the speaker and the microphone.

Some mobile communication devices are provided with a hands-free call function with which a user makes a phone call without holding the mobile communication device in hands. When the hands-free call function is used, by making louder a voice output from the speaker and increasing the sensitivity of the microphone, the mobile communication device enables the user to talk on it even being some distance therefrom. However, when the hands-free call function is used, echo easily occurs, and there is a case in which the echo cannot be prevented even if the sound insulator that insulates between the speaker and the microphone is provided as explained in the technology described in JP-A-2008-182296. In this case, by lowering the volume of the incoming voice or making mute the outgoing voice when the incoming voice is output like a transceiver, the echo can be reduced; however, the voice gets lower and it is thereby hard to follow conversations, which results in degradation of call voice quality.

For the foregoing reasons, there is a need for a mobile communication device and an echo cancellation method capable of reducing the echo and suppressing degradation of the call voice quality.

SUMMARY

According to an aspect, a mobile communication device includes a housing, a speaker, a microphone, a detecting unit, and a processing unit. The speaker is provided in the housing, and outputs an incoming voice according to an incoming voice signal. The microphone is provided in the housing. The microphone receives an outgoing voice and outputs an outgoing voice signal in response to reception of the outgoing voice. The detecting unit detects vibration of the housing and outputs a housing-vibration signal indicating the vibration of the housing. The processing unit performs echo cancellation to the outgoing voice signal based on the incoming voice signal and the housing-vibration signal.

According to another aspect, an echo cancellation method for a mobile communication device includes outputting an incoming voice, according to an incoming voice signal, from a speaker provided in a housing of the mobile communication device; receiving an outgoing voice by a microphone provided in the housing; converting the outgoing voice to an outgoing voice signal to be transmitted; detecting vibration of the housing to output a housing-vibration signal indicating the vibration of the housing; and performing echo cancellation to the outgoing voice signal based on the incoming voice signal and the housing-vibration signal.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the followings, a mobile phone will be explained as an example of the mobile communication device; however, a target to which the present invention is applied is not limited to the mobile phone. Therefore, the present invention is also applicable to various mobile communication devices provided with a call function such, including but not limited to PHSs, personal digital assistants (PDA), portable navigation units, personal computers (including but not limited to tablet computers, netbooks etc.), media players, portable electronic reading devices, and gaming devices.

Figure 1:
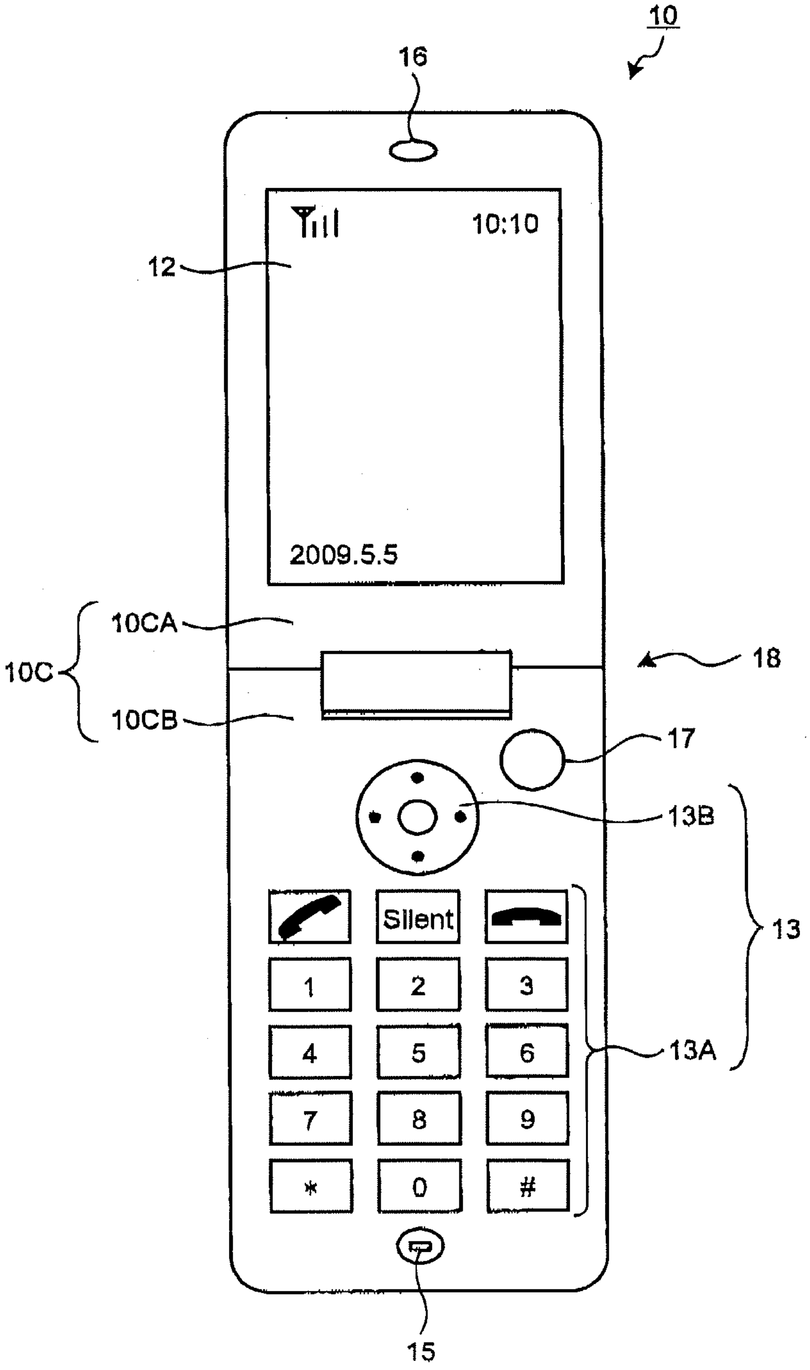
FIG. 1 is a front view of a mobile communication device according to a first embodiment.
Figure 2:
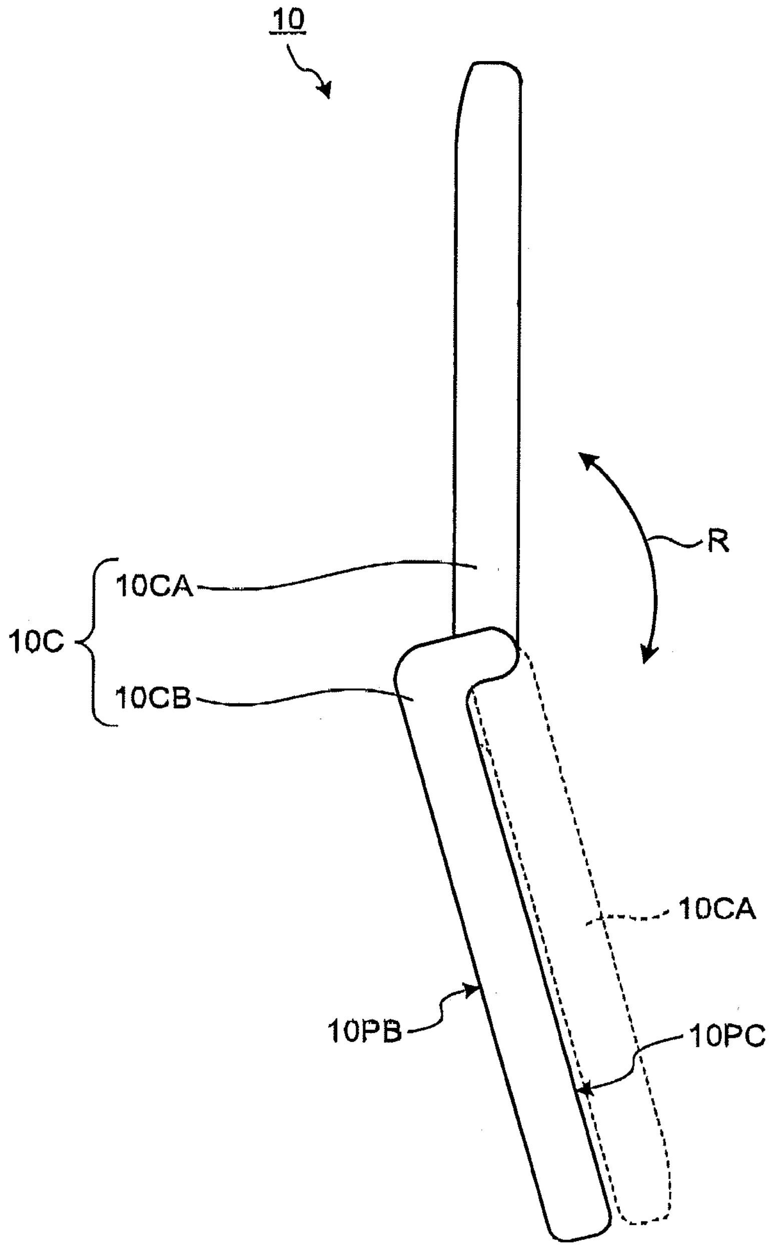
FIG. 2 is a side view of the mobile communication device.

FIG. 1 is a front view of a mobile communication device according to a first embodiment, and FIG. 2 is a side view of the mobile communication device illustrated in FIG. 1. A mobile communication device 10 illustrated in FIG. 1 and FIG. 2 is a mobile phone provided with a wireless communication function. The mobile communication device 10 has a housing 10C formed with a plurality of housings. Specifically, the housing 10C is formed with a first housing 10CA and a second housing 10CB which are openable and closable. That is, the mobile communication device 10 has a folding housing. However, the housing of the mobile communication device 10 is not limited to this configuration. For example, the housing of the mobile communication device 10 may be a sliding type housing in which one housing and the other housing can mutually slide each other from a state where both the housings are overlapped, may be a rotating type housing in which one of housings is made to rotate around an axis line along an overlapping direction, may be a housing in which two housings are coupled to each other via a two-axis hinge, or may be a straight type housing having a single box-shaped structure.

The first housing 10CA and the second housing 10CB are coupled to each other by a hinge mechanism 18 being a coupling portion. By coupling the first housing 10CA and the second housing 10CB with the hinge mechanism 18, both the first housing 10CA and the second housing 10CB can pivot around the hinge mechanism 18 so as to pivot in a direction of separating from each other and a direction of approaching each other (directions indicated by arrow R in FIG. 2). When the first housing 10CA and the second housing 10CB pivot in the direction of separating from each other, the mobile communication device 10 opens, while when the first housing 10CA and the second housing 10CB pivot in the direction of approaching each other, the mobile communication device 10 closes, to be in its folded state (state indicated by dotted line in FIG. 2).

The first housing 10CA includes a display 12 illustrated in FIG. 1 as a display unit. The display 12 displays a standby image when the mobile communication device 10 awaits reception, and displays a menu image used to assist the operations of the mobile communication device 10. The first housing 10CA also includes a receiver 16 being an output unit that outputs voice during a phone call using the mobile communication device 10.

The second housing 10CB includes a plurality of operation keys 13A used to input a telephone number of a call partner and a text when mail is composed or so, and includes a direction key and decision key (direction and decision keys) 13B so as to easily perform selection and decision of a menu appearing on the display 12 and perform scrolling of a screen, and so on. The operation keys 13A and the direction and decision keys 13B constitute an operating unit 13 of the mobile communication device 10. The operating unit 13 is provided on an operating surface 10PC of the second housing 10CB as illustrated in FIG. 2. The side opposite to the operating surface 10PC is a back side 10PB of the mobile communication device 10.

An antenna is internally provided in the second housing 10CB. The antenna is a transmitting and receiving antenna used for wireless communication, and is used for transmission and reception of radio waves (electromagnetic waves) related to phone call and e-mail and so on between the mobile communication device 10 and a base station. The second housing 10CB includes a microphone 15 being a sound acquiring unit that receives voice during a phone call using the mobile communication device 10, and a speaker 17 being an output unit that outputs voice during a phone call using the mobile communication device 10 and outputs a ring tone. The microphone 15 and the speaker 17 are located on the operating surface 10PC side of the mobile communication device 10 as illustrated in FIG. 2. In the present embodiment, the speaker 17 is provided on the side of the operating surface 10PC; however, the speaker 17 may be provided on the side of the back side 10PB.

Figure 3:
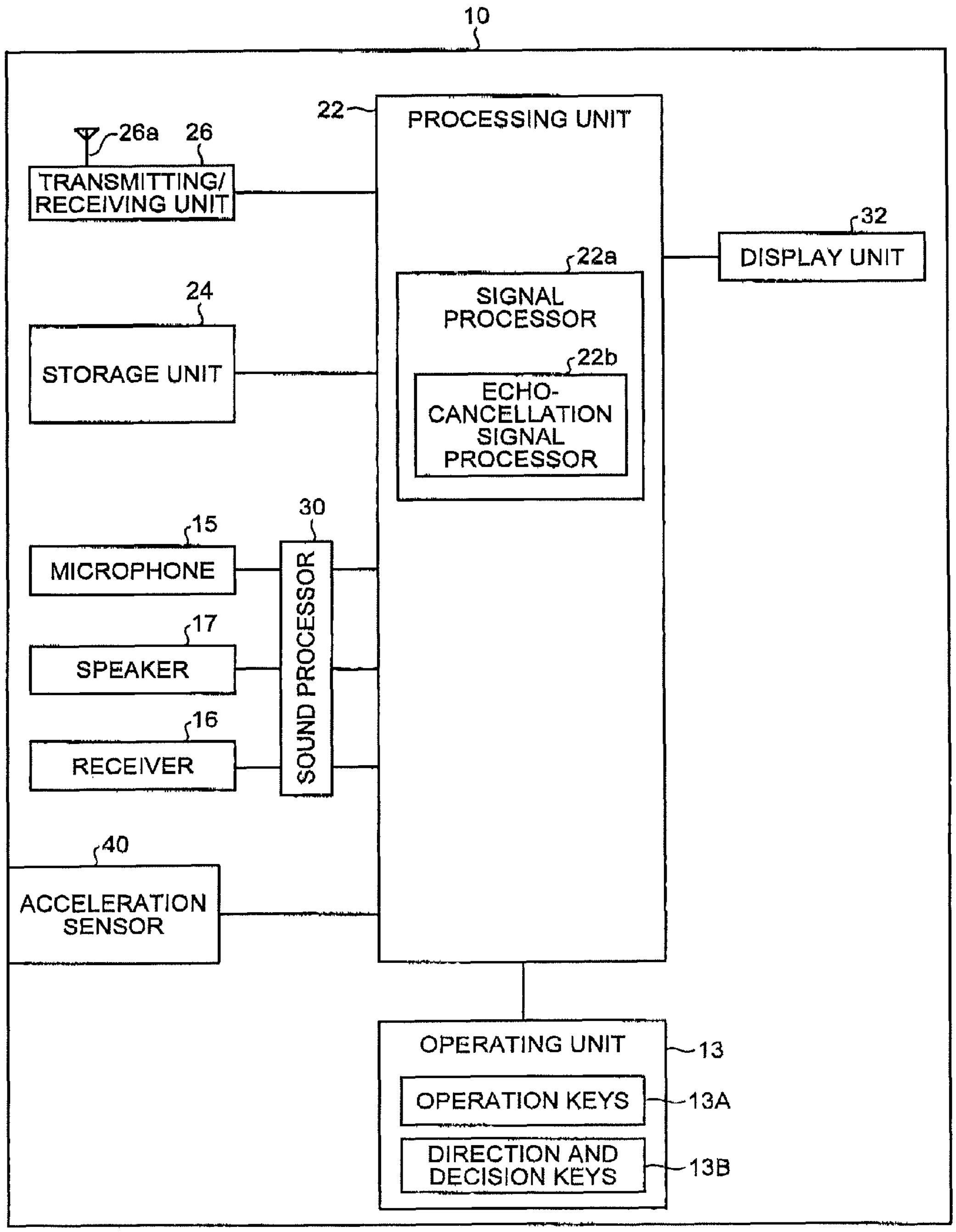
FIG. 3 is a block diagram of the mobile communication device.

FIG. 3 is a block diagram of the mobile electronic device illustrated in FIG. 1 and FIG. 2. As illustrated in FIG. 3, the mobile communication device 10 includes a processing unit 22, a storage unit 24, a transmitting/receiving unit 26, the operating unit 13, a sound processor 30, a display unit 32, and an acceleration sensor 40. The processing unit 22 has a function of integrally controlling an entire operation of the mobile communication device 10. That is, the processing unit 22 controls the operations of the transmitting/receiving unit 26, the sound processor 30, the display unit 32, the acceleration sensor 40, and the like so that various processes of the mobile communication device 10 are executed in an appropriate procedure according to an operation through the operating unit 13 and software stored in the storage unit 24 of the mobile communication device 10.

The various processes of the mobile communication device 10 are, for example, a voice call over a line switching network, composition, transmission, and reception of e-mail, and browsing of Web (World Wide Web) sites on the Internet. The operations of the transmitting/receiving unit 26, the sound processor 30, the display unit 32, and the like are, for example, transmission and reception of signals by the transmitting/receiving unit 26, sound input and output by the sound processor 30, and image display by the display unit 32.

The processing unit 22 executes various processes based on programs (for example, operating system programs and application programs) stored in the storage unit 24. The processing unit 22 includes, for example, a micro processing unit (MPU), and executes the various processes of the mobile communication device 10 according to the procedure instructed by the software. That is, the processing unit 22 sequentially reads operation codes from the operating system programs and the application programs or the like stored in the storage unit 24 to perform the processes.

The processing unit 22 has a function of executing a plurality of application programs. The application program executed by the processing unit 22 includes a plurality of application programs such as an application program for controlling the drive of the acceleration sensor 40, an application program for performing a signal processing on a sound signal, an application program for reading various image files (image information) from the storage unit 24 and decoding them, and an application program for causing the display unit 32 to display an image obtained by being decoded.

In the present embodiment, the processing unit 22 includes a signal processor 22*a* that performs signal processing on an outgoing voice signal and an incoming voice signal. The signal processor 22*a* includes an echo-cancellation signal processor 22*b* that performs echo cancellation on the outgoing voice signal. Functions respectively provided in the signal processor 22*a* and the echo-cancellation signal processor 22*b* are implemented by hardware resources including the processing unit 22 and the storage unit 24 that perform each task assigned by the control unit of the processing unit 22. The task mentioned here represents a unit of processes in which some processes cannot be simultaneously executed, of all processes performed by the application software or of processes performed by the same application software.

The storage unit 24 stores therein software and data used for the processes executed by the processing unit 22. The storage unit 24 also stores therein a task activating the application program for controlling the drive of the acceleration sensor 40, a task activating the application program for performing signal processing on a sound signal, and a task activating the image processing program. The storage unit 24 stores therein, in addition to the tasks, for example, speech data through communications or downloaded, software used by the processing unit 22 to provide control for the storage unit 24, an address book in which telephone numbers and mail addresses of the other parties, and the like are set for management, a sound file such as a dial tone and a ring tone, and temporary data used in the processing process of the software.

The computer program and the temporary data used in the processing process of the software are temporarily stored in a work area assigned to the storage unit 24 by the processing unit 22. The storage unit 24 includes one or more non-transitory storage medium, for example, a nonvolatile memory (such as ROM, EPROM, flash card etc.) and/or a storage device (such as magnetic storage device, optical storage device, solid-state storage device etc.).

The transmitting/receiving unit 26 includes an antenna 26*a*, establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the transmitting/receiving unit 26. The operating unit 13 includes the operation keys 13A and the direction and decision keys 13B assigned with various functions, for example, a power key, a talk key, numeric keys, character keys, direction keys, a decision key, and a send key. When any of the keys is input through a user operation, the operating unit 13 generates a signal corresponding to the content of the user operation. The generated signal is input to the processing unit 22 as an instruction of the user.

The sound processor 30 performs a process on a sound signal input to the microphone 15 and on a sound signal output from the receiver 16 and a speaker 17. That is, the sound processor 30 amplifies the sound signal input through the microphone 15 and outputs the amplified sound signal to the processing unit 22. The sound processor 30 amplifies a sound signal sent from the processing unit 22 and outputs the amplified sound signal to the receiver 16 and/or the speaker 17. The speaker 17 is disposed in the housing 10C of the mobile communication device 10, and outputs a ring tone, a send tone of mail, or the like. In addition, when the user makes a hands-free call for talking without holding the mobile communication device 10 in hands, the speaker 17 outputs an incoming voice.

The display unit 32 includes the display 12, and displays a video according to video data and an image according to image data supplied from the processing unit 22 on a display panel. The display 12 includes the display panel formed from, for example, a liquid crystal display (LCD) or an organic electro-luminescence display (OELD). The display unit 32 may include a sub-display in addition to the display 12.

The acceleration sensor 40 is a sensor disposed in the housing 10C and that detects an acceleration of the housing 10C. Any type of acceleration sensor can be used as the acceleration sensor 40, such as a capacitive type acceleration sensor and a piezoresistive type acceleration sensor. The mobile communication device 10 is basically configured in the above manner.

Figure 4:
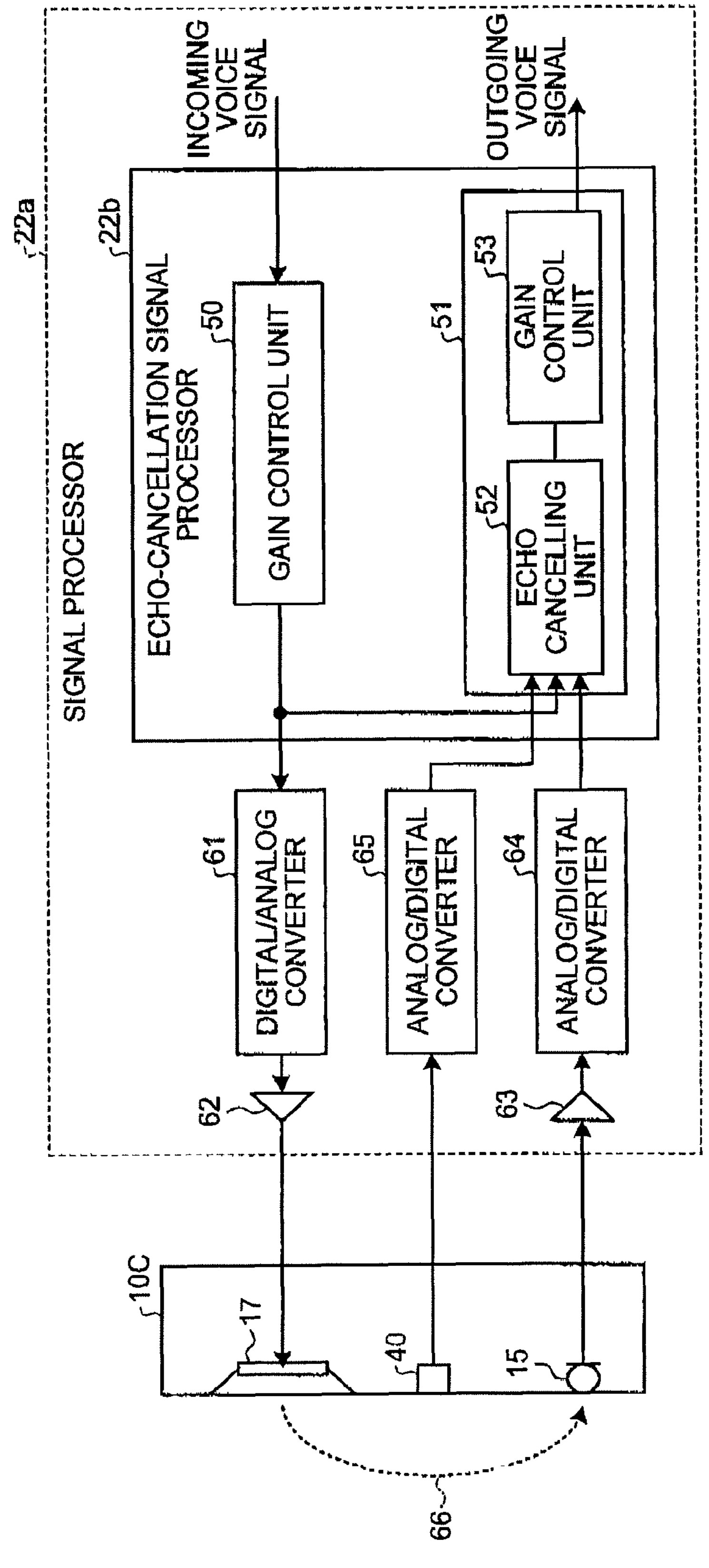
FIG. 4 is a diagram of a configuration of a signal processor and an echo-cancellation signal processor illustrated in FIG. 3, and of an outline of arrangement of a microphone, a speaker, and an acceleration sensor in a housing.

FIG. 4 is a diagram of a configuration of the signal processor 22*a* and the echo-cancellation signal processor 22*b* illustrated in FIG. 3, and of an outline of arrangement of the microphone 15, the speaker 17, and the acceleration sensor 40 in the housing 10C. The signal processor 22*a* includes the echo-cancellation signal processor 22*b*, a digital/analog (D/A) converter 61, amplifiers 62 and 63, and analog/digital (A/D) converters 64 and 65. The echo-cancellation signal processor 22*b* includes a gain control unit 50 and an outgoing voice processor 51. The outgoing voice processor 51 includes an echo cancelling unit 52 and a gain control unit 53.

The gain control unit 50 adjusts a gain of the incoming voice signal received by the transmitting/receiving unit 26 (see FIG. 3) to output the adjusted signal to the echo cancelling unit 52 and the D/A converter 61. The D/A converter 61 converts a digital incoming voice signal input from the gain control unit 50 to an analog incoming voice signal, and outputs the analog incoming voice signal to the amplifier 62. The amplifier 62 amplifies the analog incoming voice signal input from the D/A converter 61 and outputs the amplified analog incoming voice signal to the speaker 17 disposed in the housing 10C, and the speaker 17 outputs the incoming voice.

The microphone 15 disposed in the housing 10C converts an input outgoing voice to an analog outgoing voice signal and outputs the analog outgoing voice signal to the amplifier 63. The amplifier 63 amplifies the analog outgoing voice signal input from the microphone 15, and outputs the amplified analog outgoing voice signal to the A/D converter 64. The A/D converter 64 converts the analog outgoing voice signal input from the amplifier 63 to a digital outgoing voice signal, and outputs the digital outgoing voice signal to the echo cancelling unit 52.

Incidentally, when the incoming voice is output from the speaker 17 in the above manner, echo may sometimes be input into the microphone 15. A first path of the echo is a path along which sound output from the speaker 17 moves through the air to be input into the microphone 15, as indicated by arrow 66 in FIG. 4. The echo moving through the first path can be cancelled by the echo cancelling unit 52 using the incoming voice signal (output signal of the gain control unit 50) as a reference signal.

A second path of the echo is a path along which vibration of the speaker 17 moves through the housing 10C and sound due to the vibration is input into the microphone 15. The echo moving through the second path is caused by the vibration of the housing 10C, and cannot thereby be cancelled even if the incoming voice signal is used. Therefore, to cancel the echo moving through the second path, the present embodiment is configured so that the acceleration sensor 40 is disposed on an internal wall of the housing 10C so as to be adjacent to the speaker 17, the acceleration sensor 40 detects the vibration of the housing 10C, the A/D converter 65 converts an output signal (signal indicating the vibration of the housing 10C) of the acceleration sensor 40 to a digital signal, and the echo cancelling unit 52 uses the digital signal as the reference signal to cancel the echo. Although varying to a size of housing 10C, a vibration frequency of the housing 10C is in a voice band of approximately 400 Hz to 500 Hz.

The echo cancelling unit 52 uses the output signal of the gain control unit 50 (incoming voice signal) and the output signal of the A/D converter 65 (signal indicating the vibration of the housing 10C) as reference signals to perform echo cancellation on the output signal of the A/D converter 64 (outgoing voice signal). For example, the echo cancelling unit 52 adds signals obtained by respectively inverting the phase of the output signal of the gain control unit 50 and the phase of the output signal of the A/D converter 65 by 180 degrees to the output signal of the A/D converter 64, and can thereby perform echo cancellation on the output signal of the A/D converter 64.

The gain control unit 53 adjusts the gain of the output signal of the echo cancelling unit 52 to output the adjusted signal to the transmitting/receiving unit 26 (see FIG. 3), and the transmitting/receiving unit 26 modulates the output signal of the gain control unit 53 and transmits the modulated output signal.

Figure 5:
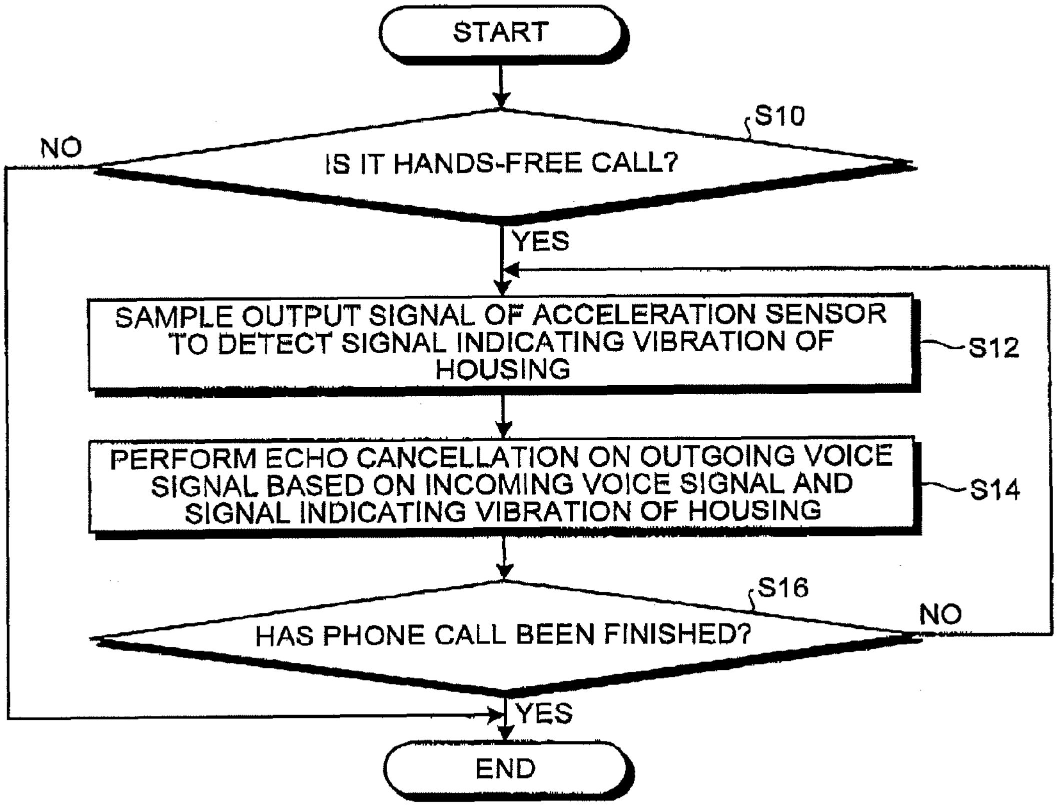
FIG. 5 is a flowchart of an example of a processing Operation of the mobile communication device.

Next, an operation of the mobile communication device 10, specifically, an echo-cancellation control operation during a phone call will be explained with reference to FIG. 5. FIG. 5 is a flowchart of an echo cancellation process of the mobile communication device 10 during a phone call. The mobile communication device 10 performs the processes illustrated in FIG. 5 during each phone call.

First, the echo cancelling unit 52 determines whether a hands-free-call start operation has been input to the operating unit 13 by an operator, at Step S10. When it is determined that the hands-free-call start operation has been input to the operating unit 13 by the operator (Yes), the echo cancelling unit 52 advances the process to Step S12, while when it is determined that the hands-free-call start operation has not been input to the operating unit 13 by the operator (No), the echo cancelling unit 52 ends the process.

When it is determined at Step S10 that the hands-free-call start operation has been input to the operating unit 13 by the operator (Yes), the echo cancelling unit 52 samples the output signal of the acceleration sensor 40 converted to the digital signal by the A/D converter 65, and detects a signal indicating the vibration of the housing 10C, at Step S12.

Subsequently, the echo cancelling unit 52 performs echo cancellation on the outgoing voice signal (output signal of the A/D converter 64) based on the incoming voice signal (output signal of the gain control unit 50) and the signal indicating the vibration of the housing 10C (output signal of the A/D converter 65), at Step S14.

Subsequently, the echo cancelling unit 52 determines whether the phone call has been finished, at Step S16. When it is determined that the phone call has not been finished (No), the echo cancelling unit 52 advances the process to Step S12. When it is determined that the phone call has been finished (Yes), the process is ended.

The above processes enable the echo cancelling unit 52 to reduce the echo due to the vibration of the housing 10C and suppress degradation of call voice quality. Thereby the volume of the incoming voice can be increased, and this more appropriately enables the hands-free call. That is, the echo cancelling unit 52 can reduce the component of echo produced when the housing 10C vibrates due to the vibration of the speaker 17 outputting an incoming voice and the vibration of the housing 10C propagates to the microphone 15, by detecting the vibration of the housing 10C using the acceleration sensor 40 and performing the process of cancelling the echo based on the detected vibration, even if the hands-free call function is used with a configuration where a speaker and a microphone are closely arranged in a compact housing. Thereby the echo due to the vibration of the housing 10C can be reduced, and the echo produced when the volume of the incoming voice is increased can be reduced. As a result, the volume of the incoming voice can be increased while reducing the echo, thus suppressing degradation of the call voice quality.

Figure 6A:
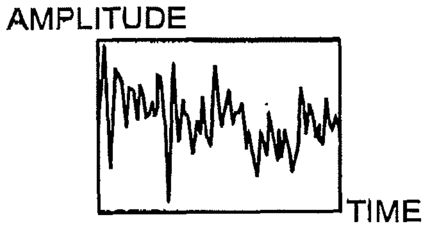
FIG. 6A is a diagram of an example of an output signal of a gain control unit.
Figure 6B:
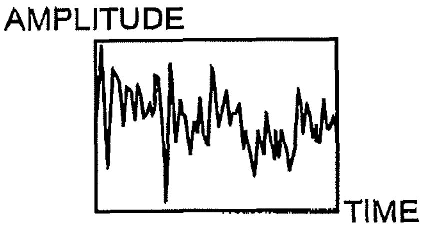
FIG. 6B is a diagram of an example of an incoming voice signal.
Figure 6C:
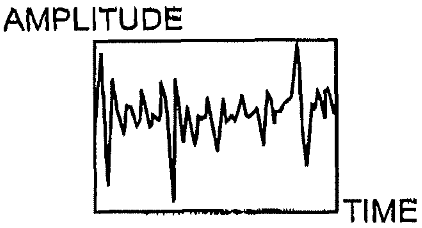
FIG. 6C is a diagram of an example of an outgoing voice signal.
Figure 6D:
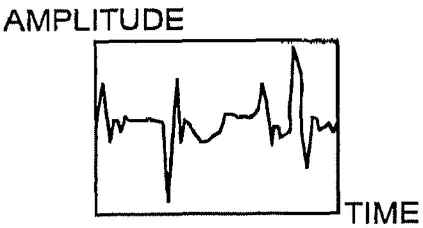
FIG. 6D is a diagram of an example of an output signal of an acceleration sensor.
Figure 7A:
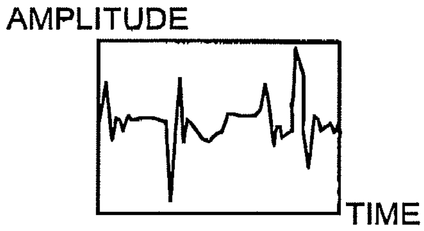
FIG. 7A is a diagram of an example of an echo leakage component in an output signal of an echo cancelling unit.
Figure 7B:
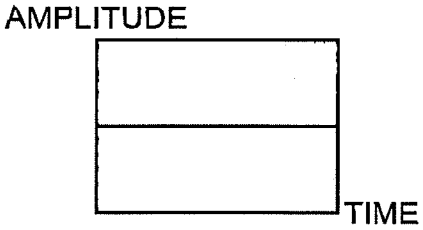
FIG. 7B is a diagram of an example of an echo leakage component in an output signal of the echo cancelling unit.

FIG. 6A to FIG. 6D and FIG. 7A to FIG. 7B are diagrams of examples of signals in the units of the signal processor 22*a*. FIG. 6A is a diagram of an example of an output signal (incoming voice signal) of the gain control unit 50. FIG. 6B is a diagram of an example of an output signal (incoming voice signal) of the amplifier 62. FIG. 6C is a diagram of an example of an input signal (outgoing voice signal) of the amplifier 63. FIG. 6D is a diagram of an example of an input signal (output signal of the acceleration sensor 40) of the A/D converter 65. FIG. 7A and FIG. 7B are diagrams of examples of an echo leakage component in the output signal of the echo cancelling unit 52. The echo cancelling unit 52 performs echo cancellation on the input signal (see FIG. 6C) of the amplifier 63 based on the output signal (see FIG. 6A) of the gain control unit 50 and the input signal (see FIG. 6D) of the A/D converter 65.

If the echo cancelling unit 52 performs the echo cancellation on the input signal (see FIG. 6C) of the amplifier 63 based on only the output signal (see FIG. 6A) of the gain control unit 50, the echo leakage component in the output signal of the echo cancelling unit 52 contains an echo component due to the vibration of the housing 10C, as illustrated in FIG. 7A. Meanwhile, if the echo cancelling unit 52 performs echo cancellation on the input signal (see FIG. 6C) of the amplifier 63 based on the output signal (see FIG. 6A) of the gain control unit 50 and the input signal (see FIG. 6D) of the A/D converter 65, the echo leakage component in the output signal of the echo cancelling unit 52 approaches almost zero, ideally, as illustrated in FIG. 7B. In this way, according to the present embodiment, it is possible to reduce the echo leakage component and prevent the degradation of the call voice quality. Moreover, the volume of the incoming voice can be increased, and this more appropriately enables the hands-free call.

The processes of the processing unit 22 during a hands-free call has been explained; however, the mobile communication device 10 may switch between a hands-free call mode and a normal call mode in which the incoming voice is output from the receiver 16 (see FIG. 3). In the normal call mode, for example, the processing unit 22 may add a signal obtained by inverting the phase of the incoming voice signal 180 degrees to the outgoing voice signal, to perform echo cancellation on the outgoing voice signal based on the incoming voice signal, and output the outgoing voice signal to the transmitting/receiving unit 26.

Next, a second embodiment will be explained below. It should be noted that the same reference numerals are assigned to the same components as these of the first embodiment, and explanation thereof is omitted.

Figure 8:
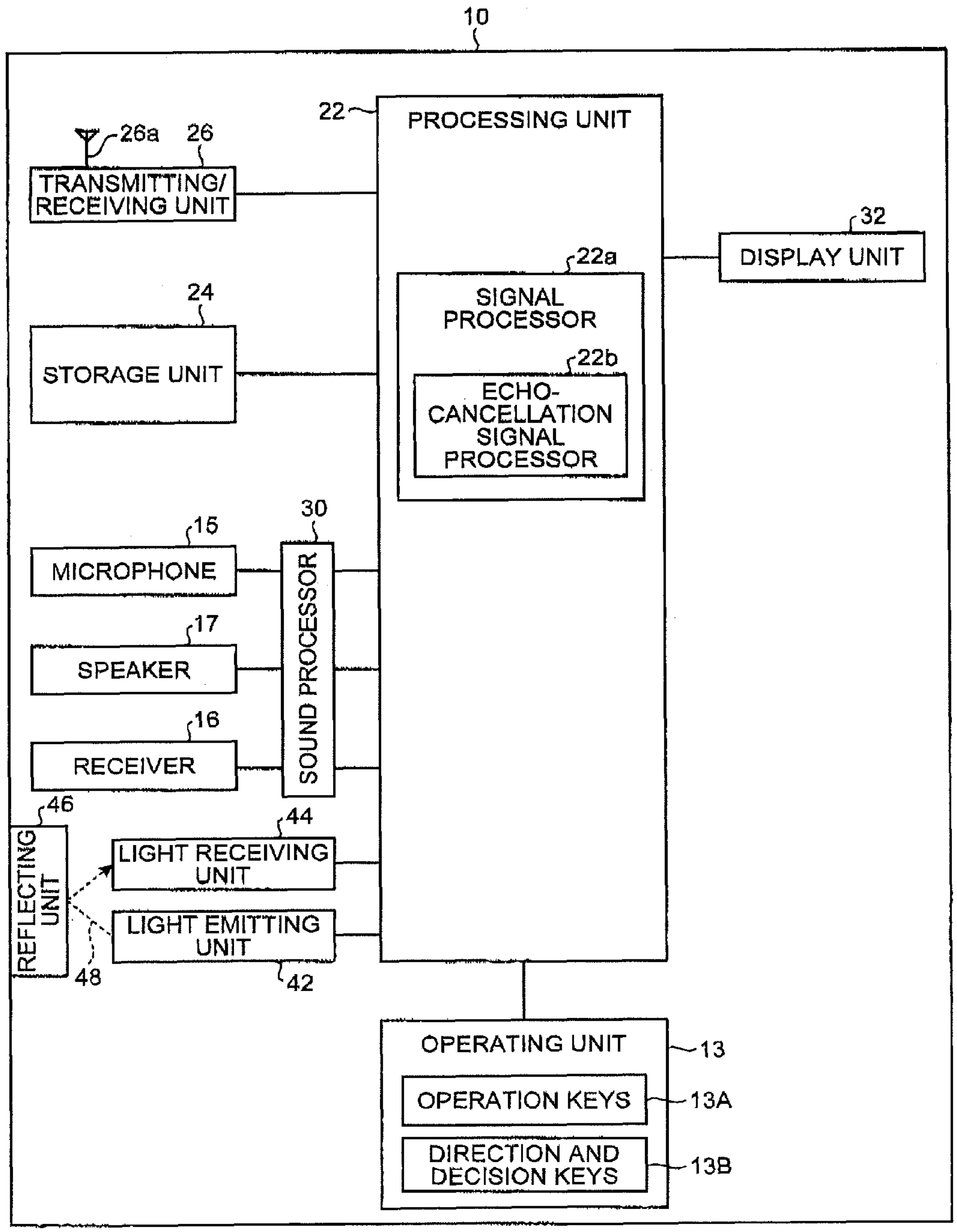
FIG. 8 is a block diagram of a mobile communication device according to a second embodiment.

FIG. 8 is a block diagram of a mobile communication device according to the second embodiment. In comparison with the mobile communication device according to the first embodiment, the mobile communication device according to the second embodiment includes alight emitting unit 42, a light receiving unit 44, and a reflecting unit 46 instead of the acceleration sensor 40.

The light emitting unit 42 includes a light-emitting diode (LED), a semiconductor laser, or the like, and emits light 48 toward the reflecting unit 46. The reflecting unit 46 is provided on the internal wall of the housing 10C, and reflects the light 48 emitted from the light emitting unit 42. The light receiving unit 44 receives the light 48 reflected by the reflecting unit 46.

Figure 9:
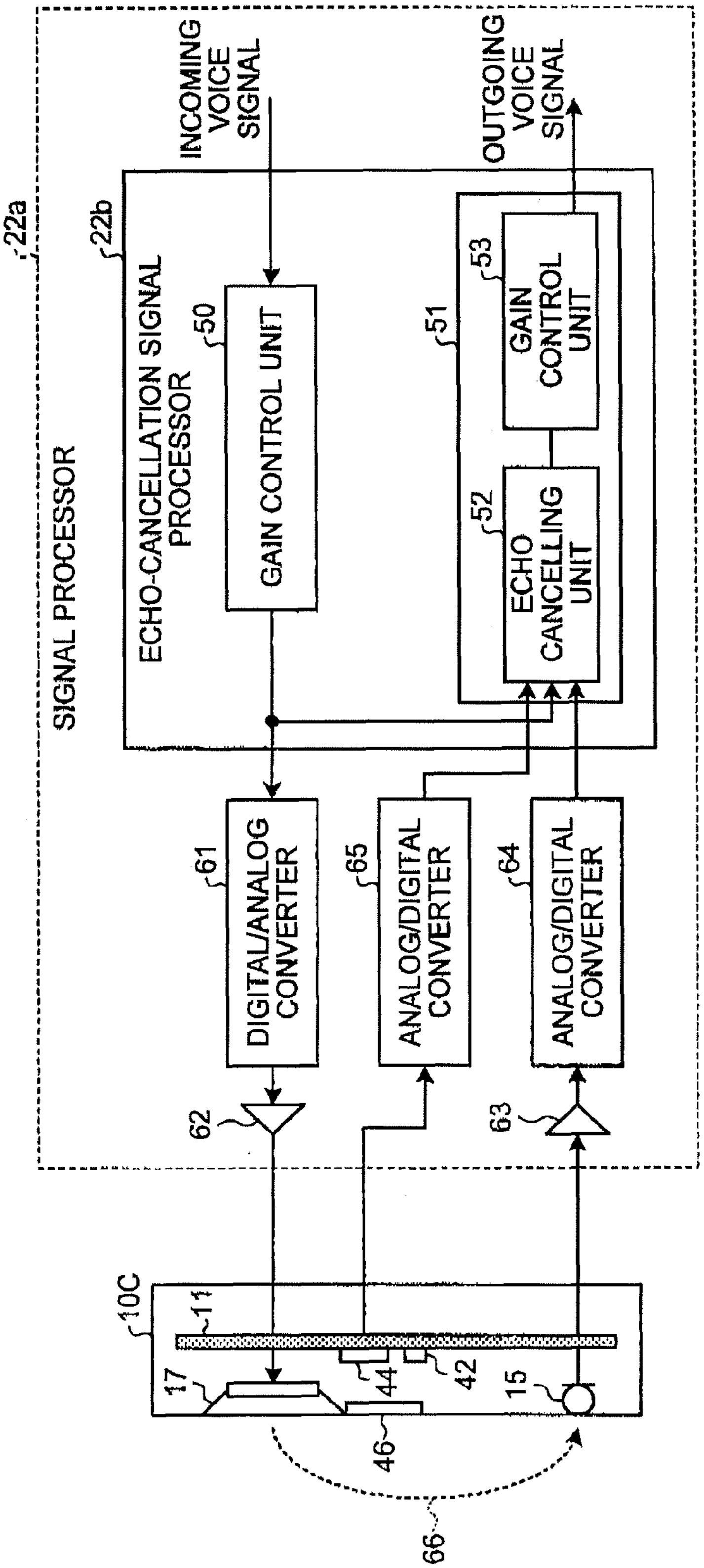
FIG. 9 is a diagram of a configuration of the signal processor and the echo-cancellation signal processor illustrated in FIG. 8, and of an outline of arrangement of the microphone, the speaker, a light emitting unit, a light receiving unit, and a reflecting unit in the housing.

FIG. 9 is a diagram of a configuration of the signal processor 22*a* and the echo-cancellation signal processor 22*b* illustrated in FIG. 8, and of an outline of arrangement of the microphone 15, the speaker 17, the light emitting unit 42, the light receiving unit 44, and the reflecting unit 46 in the housing 10C. The reflecting unit 46 is provided on the internal wall of the housing 10C. The light emitting unit 42 and the light receiving unit 44 are mounted on a substrate 11 with the CPU and the memory mounted thereon so as to face the reflecting unit 46.

As previously explained, the case sometimes occurs, in which when the incoming voice is output from the speaker 17, echo enters the microphone 15. The first path of the echo is the path along which the sound output from the speaker 17 moves through the air to be input into the microphone 15, as indicated by the arrow 66 in FIG. 9. The echo moving through the first path can be cancelled by the echo cancelling unit 52 using the incoming voice signal (output signal of the gain control unit 50) as the reference signal.

The second path of the echo is the path along which the vibration of the speaker 17 moves through the housing 10C and the sound due to the vibration is input into the microphone 15. The echo moving through the second path is caused by the vibration of the housing 10C, and cannot thereby be cancelled even if the incoming voice signal is used. Therefore, to cancel the echo moving through the second path, the present embodiment is configured so that the light emitting unit 42, the light receiving unit 44, and the reflecting unit 46 detect the vibration of the housing 10C, the A/D converter 65 converts an output signal (signal indicating the vibration of the housing 10C) of the light receiving unit 44 to a digital signal, and the echo cancelling unit 52 uses the digital signal as the reference signal to cancel the echo.

Figure 10:
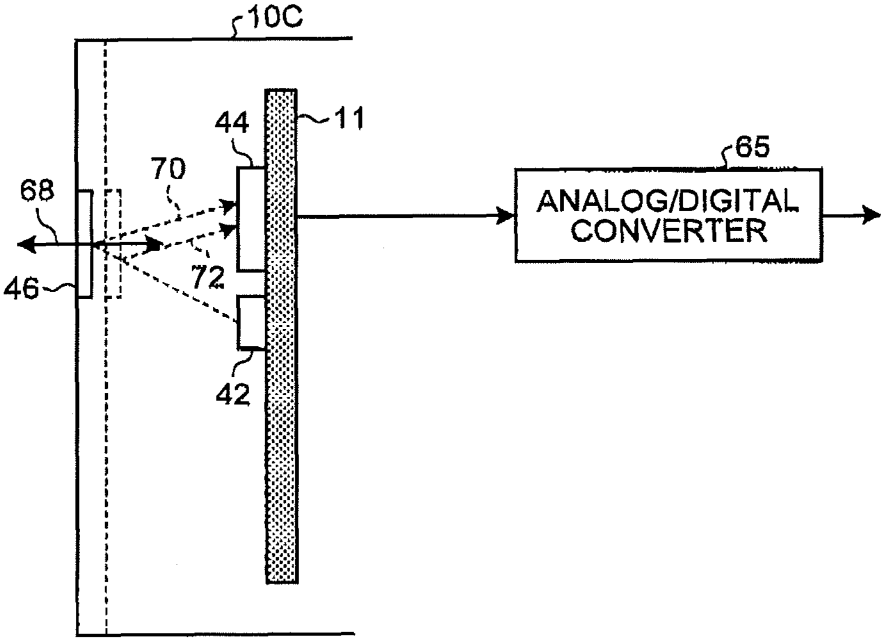
FIG. 10 is an enlarged schematic diagram of the light emitting unit, the light receiving unit, and the reflecting unit.

FIG. 10 is an enlarged schematic diagram of the light emitting unit 42, the light receiving unit 44, and the reflecting unit 46 illustrated in FIG. 9. The reflecting unit 46 is provided on the internal wall of the housing 10C, and, therefore, if the housing 10C vibrates in right and left direction of the diagram as indicated by arrow 68, the reflecting unit 46 also changes its position in right and left direction along with the housing 10C. When the reflecting unit 46 changes its position, a position where the light emitted from the light emitting unit 42 is reflected by the reflecting unit 46 changes, and therefore a position where the light enters the light receiving unit 44 also changes. For example, when the reflecting unit 46 is located on the position indicated by the solid line in FIG. 10, the light emitted from the light emitting unit 42 is reflected by the reflecting unit 46 to become a reflected light 70, and the reflected light 70 enters the light receiving unit 44. When the reflecting unit 46 is located on the position indicated by the dotted line in FIG. 10, the light emitted from the light emitting unit 42 is reflected by the reflecting unit 46 to become a reflected light 72, and the reflected light 72 enters the light receiving unit 44. The light receiving unit 44 outputs a signal indicating a light incident position (light incident pixel), as the signal indicating the vibration of the housing 10C, to the A/D converter 65.

Referring back to FIG. 9, the echo cancelling unit 52 uses the output signal of the gain control unit 50 (incoming voice signal) and the output signal of the A/D converter 65 (signal indicating the vibration of the housing 10C) as the reference signals, to perform echo cancellation on the output signal of the A/D converter 64 (outgoing voice signal).

Figure 11:
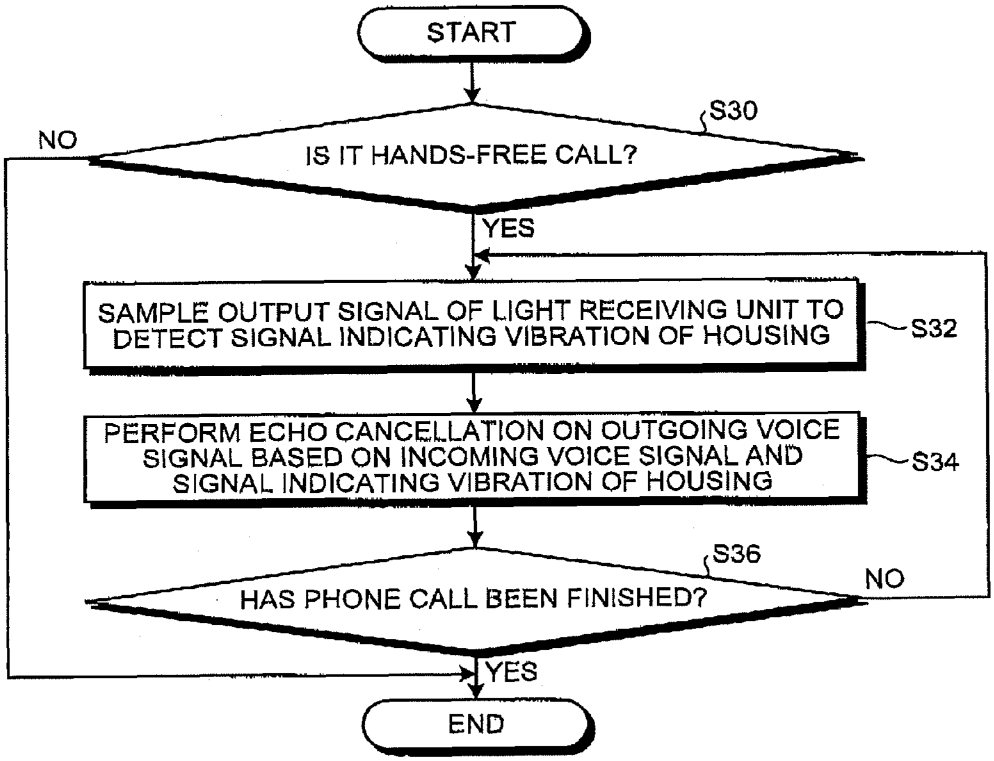
FIG. 11 is a flowchart of an example of the processing operation of the mobile communication device.

Next, an operation of the mobile communication device 10, specifically, an echo-cancellation control operation during a phone call will be explained with reference to FIG. 11. FIG. 11 is a flowchart of an echo cancellation process of the mobile communication device 10 during a phone call. The mobile communication device 10 performs the processes illustrated in FIG. 11 during each phone call.

First, the echo cancelling unit 52 determines whether a hands-free-call start operation has been input to the operating unit 13 by the operator, at Step S30. When it is determined that the hands-free-call start operation has been input to the operating unit 13 by the operator (Yes), the echo cancelling unit 52 advances the process to Step S32, while when it is determined that the hands-free-call start operation has not been input to the operating unit 13 by the operator (No), the echo cancelling unit 52 ends the process.

When it is determined at Step S30 that the hands-free-call start operation has been input to the operating unit 13 by the operator (Yes), the echo cancelling unit 52 samples the output signal of the light receiving unit 44 converted to the digital signal by the A/D converter 65, and detects a signal indicating the vibration of the housing 10C, at Step S32.

Subsequently, the echo cancelling unit 52 performs echo cancellation on the outgoing voice signal (output signal of the A/D converter 64) based on the incoming voice signal (output signal of the gain control unit 50) and the signal indicating the vibration of the housing 10C (output signal of the A/D converter 65), at Step S34.

Subsequently, the echo cancelling unit 52 determines whether the phone call has been finished, at Step S36. When it is determined that the phone call has not been finished (No), the echo cancelling unit 52 advances the process to Step S32, and when it is determined that the phone call has been finished (Yes), the process is ended.

The above processes enable the echo cancelling unit 52 to reduce the echo due to the vibration of the housing 10C and suppress degradation of call voice quality. Thereby the volume of the incoming voice can be increased, and this more appropriately enables the hands-free call. In other words, even if the hands-free call function is used with a configuration where a speaker and a microphone are closely arranged in a compact housing, the echo cancelling unit 52 can reduce the component of echo produced when the housing 10C vibrates due to vibration of the speaker 17 outputting incoming voice and the vibration of the housing 10C propagates to the microphone 15, by detecting the vibration of the housing 10C in the light emitting unit 42, the light receiving unit 44, and the reflecting unit 46, and performing the process of cancelling the echo based on the detected vibration. As a result, the echo due to the vibration of the housing 10C can be reduced, and the echo produced when the volume of the incoming voice is increased can be reduced. Thereby the volume of the incoming voice can be increased while reducing the echo, thus suppressing degradation of the call voice quality.

The advantages are that one embodiment of the invention provides a mobile communication device and an echo cancellation method capable of reducing the echo and suppressing degradation of the call voice quality.

What is claimed is:

1. A mobile communication device, comprising:

a housing;

a speaker provided in the housing for outputting an incoming voice according to an incoming voice signal;

a microphone provided in the housing for receiving an outgoing voice and outputting an outgoing voice signal in response to reception of the outgoing voice;

a detecting unit for detecting vibration of the housing and outputting a housing-vibration signal indicating the vibration of the housing;

a processing unit for performing echo cancellation to the outgoing voice signal based on the incoming voice signal and the housing-vibration signal; and a receiver for outputting the incoming voice according to the incoming voice signal, wherein the processing unit is configured to switch between a normal call mode and a hands-free call mode;

the normal call mode is a mode in which the incoming voice is output from the receiver and the echo cancellation is performed to the outgoing voice signal based on the incoming voice signal;

the hands-free call mode is a mode in which the incoming voice is output from the speaker and the echo cancellation is performed to the outgoing voice signal based on the incoming voice signal and the housing-vibration signal; and the processing unit is configured to add a signal obtained by inverting a phase of the incoming voice signal to the outgoing voice signal to perform the echo cancellation of first echo when the incoming voice is output from the speaker or the receiver, and to add a signal obtained by inverting a phase of the housing-vibration signal to the outgoing voice signal to perform the echo cancellation of second echo when the incoming voice is output from the speaker.

2. The mobile communication device according to claim 1, wherein the detecting unit is an acceleration sensor provided in the housing.

3. The mobile communication device according to claim 2, wherein the detecting unit is provided in a vicinity of the speaker.

4. The mobile communication device according to claim 1, wherein the echo cancelling unit of the processing unit is configured to add signals obtained by inverting phases of the incoming voice signal and the housing-vibration signal to the outgoing voice signal to perform the echo cancellation.

5. A mobile communication device, comprising:

a housing;

a speaker provided in the housing for outputting an incoming voice according to an incoming voice signal;

a microphone provided in the housing for receiving an outgoing voice and outputting an outgoing voice signal in response to reception of the outgoing voice;

a detecting unit for detecting vibration of the housing and outputting a housing-vibration signal indicating the vibration of the housing; and a processing unit for performing echo cancellation to the outgoing voice signal based on the incoming voice signal and the housing-vibration signal, wherein the detecting unit includes:

a light emitting unit provided inside the housing for emitting light;

a reflecting unit provided on an internal wall of the housing for reflecting the light emitted from the light emitting unit; and a light receiving unit provided inside the housing for outputting a signal indicating an incident position of the light reflected by the reflecting unit, as the housing-vibration signal.

6. An echo cancellation method performed by a mobile communication device and comprising:

outputting an incoming voice, according to an incoming voice signal, from a speaker provided in a housing of the mobile communication device;

receiving an outgoing voice by a microphone provided in the housing;

converting the outgoing voice to an outgoing voice signal to be transmitted;

detecting vibration of the housing to output a housing-vibration signal indicating the vibration of the housing;

performing echo cancellation to the outgoing voice signal based on the incoming voice signal and the housing-vibration signal;

outputting the incoming voice according to the incoming voice signal from a receiver provided in a housing of the mobile communication device; and switching between a normal call mode and a hands-free call mode, wherein the normal call mode is a mode in which the incoming voice is output from the receiver and the echo cancellation is performed to the outgoing voice signal based on the incoming voice signal;

the hands-free call mode is a mode in which the incoming voice is output from the speaker and the echo cancellation is performed to the outgoing voice signal based on the incoming voice signal and the housing-vibration signal; and a signal obtained by inverting a phase of the incoming voice signal is added to the outgoing voice signal so that the echo cancellation of first echo is performed when the incoming voice is output from the speaker or the receiver, and a signal obtained by inverting a phase of the housing-vibration signal is added to the outgoing voice signal so that the echo cancellation of second echo is performed when the incoming voice is output from the speaker.

7. A mobile communication device, comprising:

a housing;

a speaker provided in the housing for outputting an incoming voice according to an incoming voice signal;

a microphone provided in the housing for receiving an outgoing voice and outputting an outgoing voice signal in response to reception of the outgoing voice;

a detecting unit for detecting vibration of the housing and outputting a housing-vibration signal indicating the vibration of the housing; and a processing unit for performing echo cancellation to the outgoing voice signal based on the incoming voice signal and the housing-vibration signal, wherein the processing unit is configured to add a signal obtained by inverting a phase of the incoming voice signal to the outgoing voice signal to perform the echo cancellation of first echo when the incoming voice is output from the speaker, and to add a signal obtained by inverting a phase of the housing-vibration signal to the outgoing voice signal to perform the echo cancellation of second echo when the incoming voice is output from the speaker.

8. A mobile communication device, comprising:

a housing;

a speaker provided in the housing for outputting an incoming voice according to an incoming voice signal;

a microphone provided in the housing for receiving an outgoing voice and outputting an outgoing voice signal in response to reception of the outgoing voice;

a detecting unit for detecting vibration of the housing and outputting a housing-vibration signal indicating the vibration of the housing;

a processing unit for performing echo cancellation to the outgoing voice signal based on the incoming voice signal and the housing-vibration signal; and a receiver for outputting the incoming voice according to the incoming voice signal, wherein the processing unit is configured to switch between a normal call mode and a hands-free call mode;

the normal call mode is a mode in which the incoming voice is output from the receiver and the echo cancellation is performed to the outgoing voice signal based on the incoming voice signal; and the hands-free call mode is a mode in which the incoming voice is output from the speaker and the echo cancellation is performed to the outgoing voice signal based on the incoming voice signal and the housing-vibration signal.

9. A mobile communication device according to claim 8, wherein the processing unit includes:

a first gain control unit configured to adjust a gain of the incoming voice signal, and an outgoing voice processor having an echo cancelling unit and a second gain control unit, wherein the echo cancelling unit is configured to use an output signal of the first gain control unit and the housing-vibration signal as reference signals to perform the echo cancellation on the outgoing voice signal, and wherein the second gain control unit is configured to adjust a gain of the echo-cancelled outgoing voice signal outputted from the echo cancelling unit.

* * * * *